Patented Feb. 15, 1927.

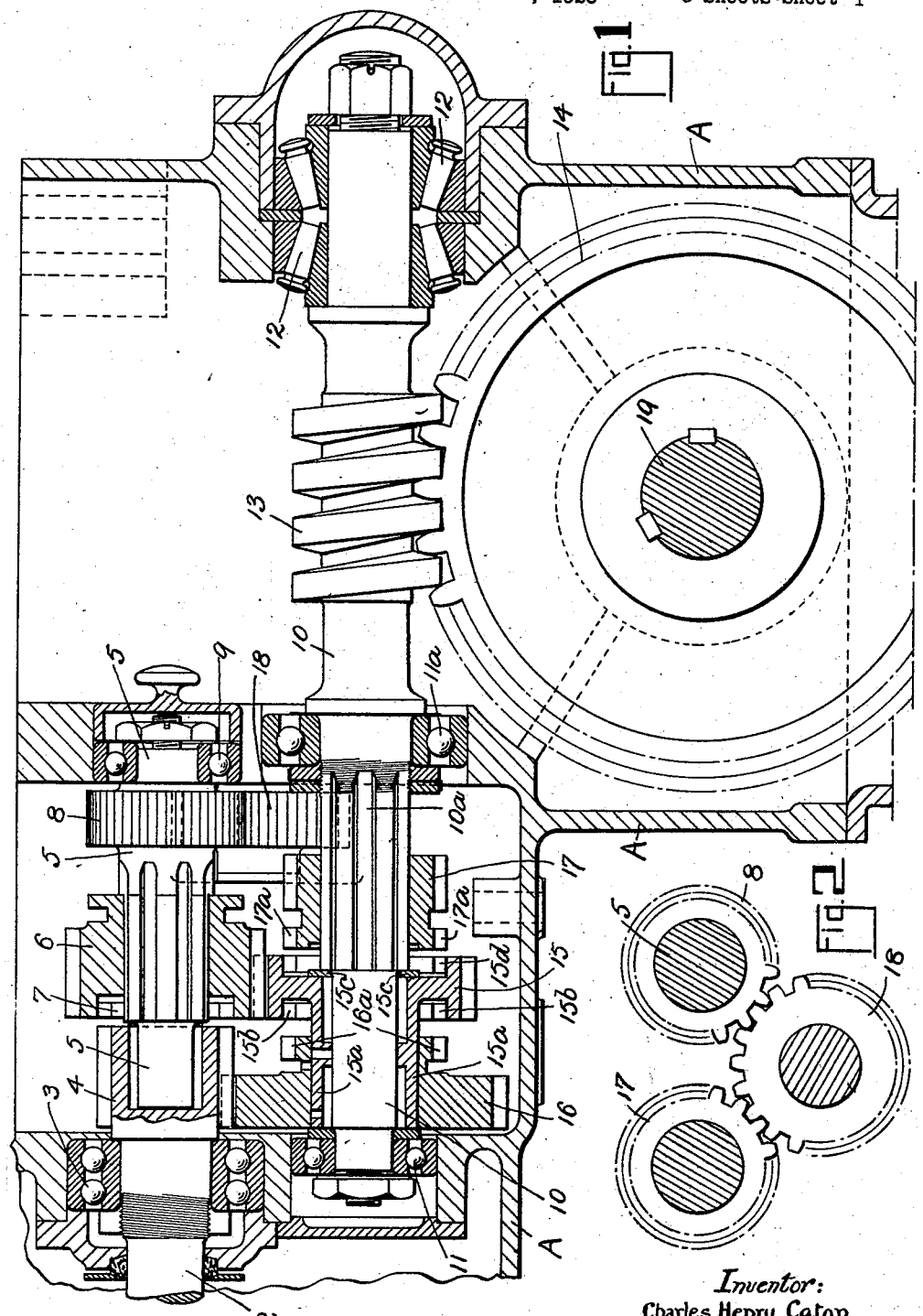

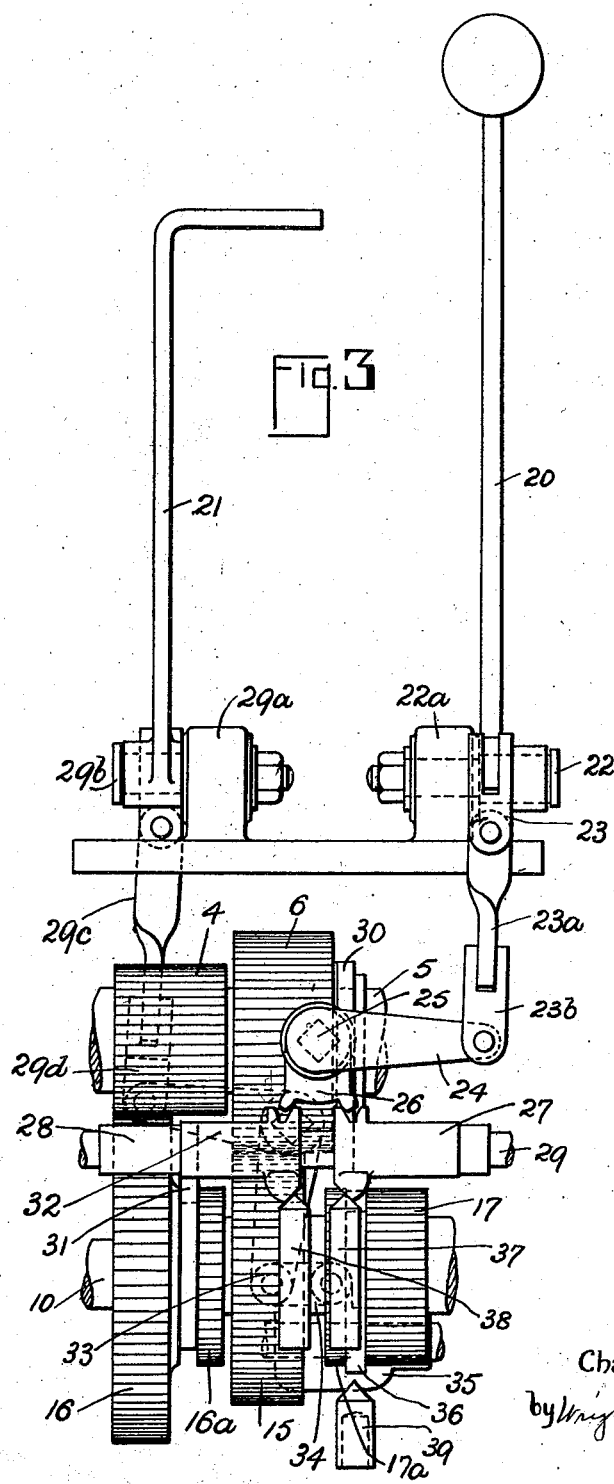

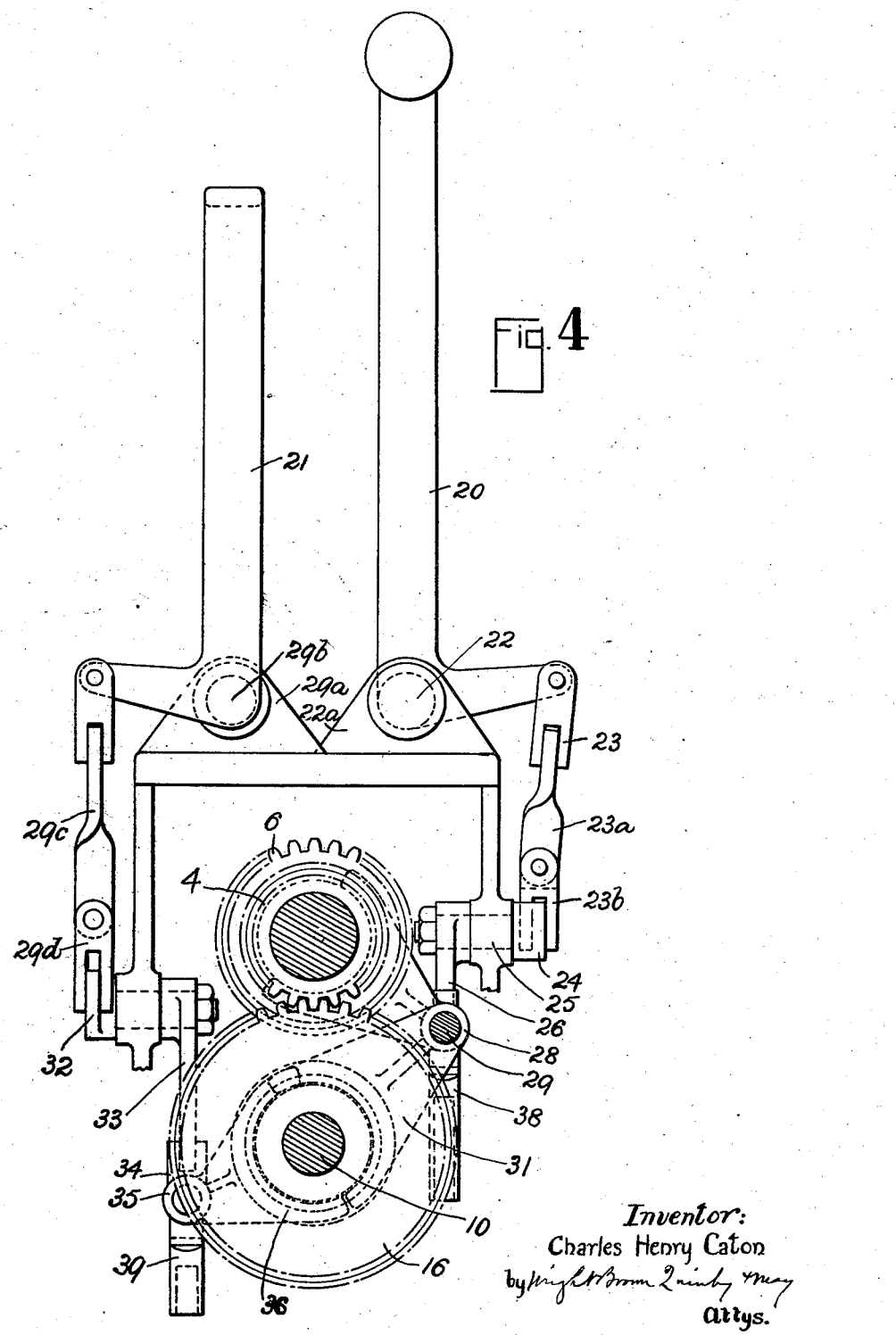

1,618,054

UNITED STATES PATENT OFFICE.

CHARLES HENRY CATON, OF LEEDS, ENGLAND.

CHANGE-SPEED GEARING FOR MOTOR VEHICLES.

Application filed June 17, 1926, Serial No. 116,613, and in Great Britain May 12, 1925.

This invention relates to change speed gearing for use in connection with motor vehicles especially such as run on rails to transport heavy loads and my present invention consists in the arrangement of the change speed gearing and the devices by which same may be operated so that I am enabled to secure two speeds in a forward direction and two speeds in a reverse direction by the employment of only seven gearing wheels, four of which secure the two changes of speed while the three other wheels are only employed for effecting these speeds in the reverse direction. In connection with these gearing wheels I arrange their operating or change speed controlling mechanism so that it is impossible for the driver to put one set into action without previously having taken the other set out of action while I further arrange said operating mechanism so that the driver may operate same while occupying a position facing crosswise the track or path over which the vehicle is travelling. Thus he is enabled to look to the right or to the left according to the direction in which he has caused the vehicle to travel.

In order that my said invention may be readily understood, I have hereunto appended a sheet of drawings illustrative thereof, to which by letters and figures, reference is made in the following description:—

Fig. 1 is a sectional elevation showing the arrangement of the driving gear and several shafts.

Fig. 2 is a sectional end elevation showing certain of the driving wheels as seen looking from right to left of Fig. 1.

Fig. 3 is a side elevation showing the gearing wheels with the hand lever controlling mechanism in connection therewith and shows the operating handles in said positions that the driver is opposite same while looking crosswise of the path over which he is travelling.

Fig. 4 is an elevation of the parts shown by Fig. 3 as seen looking from left to right of said figure.

A indicates the framework or gear box which is formed to suit my improved arrangement of gearing.

To attain the object of my invention I arrange the main shaft 2 of the driving gear to derive its motion through friction clutch couplings of any appropriate or suitable character which connect same to the engine's driving shaft.

This shaft 2 is mounted so that it may be supported by suitable ball bearings 3 while at its end opposite to the clutch coupling it may have fixed upon it or may have formed integrally with it an appropriate driving pinion 4 the teeth of which are of considerable width.

Arranged in well known manner in alignment with the driving shaft 2 is an intermediate shaft 5 upon which is splined a toothed gearing wheel 6 said splining being shown in the drawings by gearing teeth on the shaft 5 engaging with internal teeth formed in the wheel 6, and this wheel 6 has teeth of considerable width so that its movements over the shaft 5 do not interfere with its full engagement with the teeth of the wheel that it has to drive or to which it has to transmit motion. The wheel 6 has what is known as dog coupling teeth 7 formed internally within it to engage with the spur teeth of the driving pinion 4 which is fixed upon the shaft 2. At the outer end of the shaft 5 is fixed another spur wheel 8 while the two ends of the shaft 5 are respectively mounted to run on ball bearings 9 and by taking loosely into the hub of the wheel 4, as shown by Fig. 1.

Arranged parallel to the shafts 2 and 5 is a third or lay shaft 10 and this shaft is mounted on ball bearings 11, 11ᵃ and is further made to extend beyond the gear box A so that its other end may rest upon roller bearings 12. Between the bearings 11ᵃ and the bearings 12 I fix or form integrally with the shaft 10 a worm 13 and this worm gears with a worm wheel 14 which is keyed upon a shaft 19 that represents the driven shaft for transmitting motion to the road wheels of the vehicle.

Upon the sleeve 15ᵃ of a wheel 15, which I mount to run loosely on the lay shaft 10, I mount a wheel 16 which is arranged to run loosely upon said sleeve 15ᵃ. This wheel 16 gears with the wheel 4 on the main driving shaft 2 and its clutch coupling 16ᵃ is arranged to engage with the clutch coupling teeth 15ᵇ on the wheel 15. The wheel 15 is held against longitudinal movement on shaft 10 by its sleeve 15ᵃ extending between a loose collar or annular piece 15ᶜ mounted on the shaft to the hub of the bearings 11 and is arranged to mesh or gear with the wheel 6 which is splined on the shaft 5 while upon dog teeth or splines 10ª on the shaft 10 is splined a pinion 17 the teeth of which will gear with an intermediate wheel 18 (Figure 2) under conditions hereinafter described while at all times when the wheel 17 revolves it always revolves with the shaft 10.

The actions of the gearing as above described are as follows:—

When the several wheels are in the positions shown by Fig. 1 motion is transmitted from the wheel 4 to the wheel 16 while the shaft 5 and the wheel 6 will remain stationary as also will the shaft 10 since the wheel 16 is not in gear with the wheel 15 nor is the wheel 6 in gear with the wheel 4. However by moving the wheel 6 so that its clutch teeth 7 engage with the wheel 4 of the shaft 2 motion is transmitted at the same rate to the shaft 5. The wheel 6 being of equal diameter to the wheel 15 transmits its rotary motion at this time to said wheel 15 and as it is of the same diameter as the wheel 6 the speed of the wheel 15 is the same as the speed of the wheel 6 and the shaft 2. This motion of the wheel 15, by sliding the wheel 17 so that its dog clutch 17ª will mesh with the clutch teeth 15ᵈ of the wheel 15 will be transmitted through said clutch to the shaft 10 and therefore the driving worm 13 will transmit motion to the wheel 14 at the highest speed.

By moving the clutch 7 of the wheel 6 out of engagement with the wheel 4 and sliding the wheel 16 so that its clutch teeth 16ª will engage the clutch teeth 15ᵇ of the wheel 15 motion will be transmitted from the shaft 2 to the shaft 10 at the slow speed since the wheel 16 is of larger diameter than the wheel 4. At this time the motions of the wheel 16 will be transmitted to the wheel 15 so that by retaining the clutch teeth of the wheel 17 in gear with those of the wheel 15 motion is transmitted to the shaft 10 at the reduced speed desired In order to secure the reverse motion at the two speeds described by retaining the wheel 6 in mesh with the pinion 4 so as to transmit motion from the shaft 2 to the shaft 5 at the desired higher speed the wheel 8 will by engaging permanently with the wheel 18 transmit its motion at this speed to said wheel 18 and by the wheel 17 being slid upon the shaft 10 to engage with the intermediate wheel 18 the motion of the shafts 2 and 5 will be transmitted in a reverse direction to the shaft 10 and this at the higher speed. As means for transmitting the reverse motion to the shaft 10 at the lower speed the wheel 6 is thrown out of gear with the wheel 4 while the wheel 16 is slid into gear with the dog teeth 15ᵇ of the wheel 15 so that the motions of the wheel 4 are transmitted to the wheel 15 and this wheel 15 transmits said motion to the wheel 6 and therefore to the shaft 5 at the lower speed. Hence by retaining the wheel 17 in mesh with the wheel 18 the reverse motion is transmitted to the shaft 10 and at the lower speed described.

In the arrangement of driving gear as hereinbefore described I am enabled to mount the lever controlling mechanism for putting same into and out of action so that the driver may operate same while looking crosswise of the track or path over which he is travelling. To enable this to be carried into effect the two hand levers 20 and 21, which are respectively to control the change speed drive and the reverse drive, are to be operated by moving the said hand levers in the usual directions towards and from the driver while the driver is situated facing the said levers in the position shown by Fig. 3.

The change speed handle 20 is mounted upon the stud 22 and is connected by the swivelling connecting rods 23, 23ª and 23ᵇ to a lever 24 which is fixed upon a shaft 25. Upon this shaft is fixed a quadrant 26 the two teeth of which engage respectively with the teeth of two sliding hubs 27 and 28 and these slide upon a shaft 29 supported by appropriate bearings as are the brackets 22ª and 29ª which support the studs 22 and 29ᵇ for the levers 20 and 21 respectively.

As shown by Fig. 3 the quadrant member 26 is in its central position so that the engaging fork 30 carried by the hub 27 is retaining the wheel 6 in its neutral position out of engagement with the wheel 4 while said quadrant 26 is also retaining the hub 28 in its neutral position where the fork 31 carried by same retains the wheel 16 in its neutral position.

On the driver moving the handle 20 towards the rear of the position shown by Fig. 3 he actuates the quadrant 26 so that the tooth thereon which is for operating the sleeve 27 will at this time move out of engagement with said sleeve 27 while the tooth which operates the sleeve 28 will move said sleeve 28 and bring it so that the wheel 16 is carried with its engaging clutch teeth 16ª into engagement with the wheel 15 thus effecting the result hereinbefore described.

By the driver pulling the lever 20 towards him if facing the parts as shown by Fig. 3, this said lever 20 operates the quadrant 26 causing same to return and in so doing it will carry the hub 28 and therefore the fork 31 and wheel 16 back again to the neutral position shown, while by continuing the motion of the hand lever 20 the quadrant 26 will carry the quadrant tooth forward and so slide the hub 27 that the fork 30 will move the wheel 6 into engagement with the wheel 4 and also with the result as hereinbefore stated. By these two adjustments the engagement of the driving gear to carry out the two speeds hereinbefore explained, is secured and that under conditions wherein the two hubs and their forks cannot be left in any positions when the two sets of gearing will be in engagement at one and the same time.

On the driver actuating the lever 21 and moving same from himself when facing the devices shown by Fig. 3, he will move the connecting rods 29$^c$ and 29$^d$ vertically and so will operate the lever 32 that this lever will operate another lever 33 and connecting rod 34 in order to cause the hub 35 to slide from left to right from the position shown by Fig. 3. Thus the wheel 17 will be thereby carried from the neutral position shown by Fig. 3 into engagement with the wheel 18 and therefore will effect the reverse motion desired.

The two hubs 27 and 28 are held in their respective adjusted positions by the spring actuated plungers 37 and 38 respectively and these plungers are mounted upon bearings in well known manner to attain the object desired.

The hub 35 carrying the fork 36 is also held in position by a spring actuated plunger 39 under similar known conditions.

Such being the nature and object of my said invention, what I claim is:—

1. In change of speed gearing for motor vehicles, the combination of a main shaft, a pinion fixed upon said main shaft, an intermediate shaft in alignment with the main shaft, a gear splined to the intermediate shaft and provided with clutch means for engaging the pinion on the main shaft, means for sliding said gear upon the intermediate shaft, a second gear fixed to the intermediate shaft, a reverse gear meshing with the gear fixed to the intermediate shaft, a lay shaft extending parallel to the intermediate and main shafts, a sleeve loosely mounted on the lay shaft, a gear fixed to said sleeve and meshing with the gear splined to the intermediate shaft, a second gear mounted loosely upon said sleeve and meshing with the pinion on the main shaft, and having clutch teeth adapted to engage the gear fixed to said sleeve, means for sliding the said second gear upon the sleeve, a third gear splined to the lay shaft and provided with clutch couplings adapted to engage the gear fixed upon the sleeve on said shaft, and having teeth adapted to mesh with the reverse gear, means for moving said third gear longitudinally of the lay shaft, and means for transmitting motion from the lay shaft to the wheels of a vehicle.

2. In a change speed gear for motor vehicles, the combination of a main shaft, a pinion fixed on said shaft, an intermediate shaft in alignment with and having one end supported by the main shaft, a gear splined to said intermediate shaft, clutch means actuated by sliding the gear splined to the intermediate shaft longitudinally of the shaft to connect said shaft with the main shaft, a second gear fixed on the intermediate shaft, a reverse gear meshing with the gear fixed on the intermediate shaft, a lay shaft, a gear loosely mounted on the lay shaft and meshing with the gear splined to the intermediate shaft and having clutch teeth on both of its faces, a gear splined on the lay shaft and movable thereon to mesh with the reverse gear or to engage one set of clutch teeth of the aforesaid gear on the same shaft, another gear loosely mounted on the lay shaft and movable longitudinally thereon, said gear meshing with the pinion on the main shaft and having clutch teeth adapted to engage the other set of clutch teeth on the first said loosely mounted gear on the lay shaft, and means for transmitting motion from the lay shaft to the wheels of a vehicle.

3. In change speed gearing for motor vehicles, the combination of a main shaft, a pinion fixed on said shaft, an intermediate shaft, a gear splined to the intermediate shaft and provided with clutch means for connecting said shaft with the pinion on the main shaft when said gear on the intermediate shaft is in one position, a lay shaft, a sleeve loosely mounted on the lay shaft and provided with a gear that meshes with the gear splined on the intermediate shaft, a gear splined to the lay shaft and provided with a clutch coupling for connecting it with the gear on the sleeve, means for moving the gears that are splined to the intermediate and lay shafts longitudinally of said shafts to positions to render the clutch means operative and cause the lay shaft to move at a high speed the same as that of the main shaft, and means for transmitting motion of the lay shaft to the wheels of a vehicle.

4. In change speed gearing for motor vehicles, the combination of a main shaft, a pinion fixed on said shaft, a lay shaft, a sleeve loosely mounted on the lay shaft, a gear of greater diameter than the pinion on the main shaft loosely mounted on the sleeve and meshing with the pinion on the main shaft, clutch means for connecting the last said gear and sleeve, a gear splined to the lay shaft, clutch means for connecting the last said gear with the sleeve on the lay shaft when said splined gear is in one position, whereby the lay shaft will be rotated in the same direction as and at a speed less than that of the main shaft, and means for transmitting motion of the lay shaft to the wheels of a vehicle.

CHARLES HENRY CATON.